Oct. 11, 1966  M. G. CRANDELL ET AL  3,277,714
TEMPERATURE INDICATING SPOON
Filed June 10, 1963  3 Sheets-Sheet 1
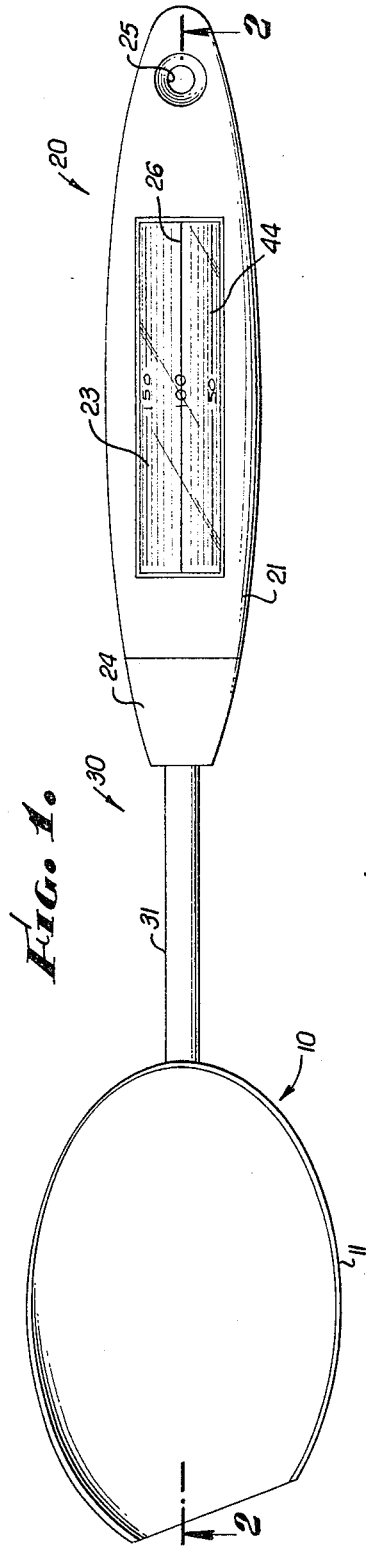
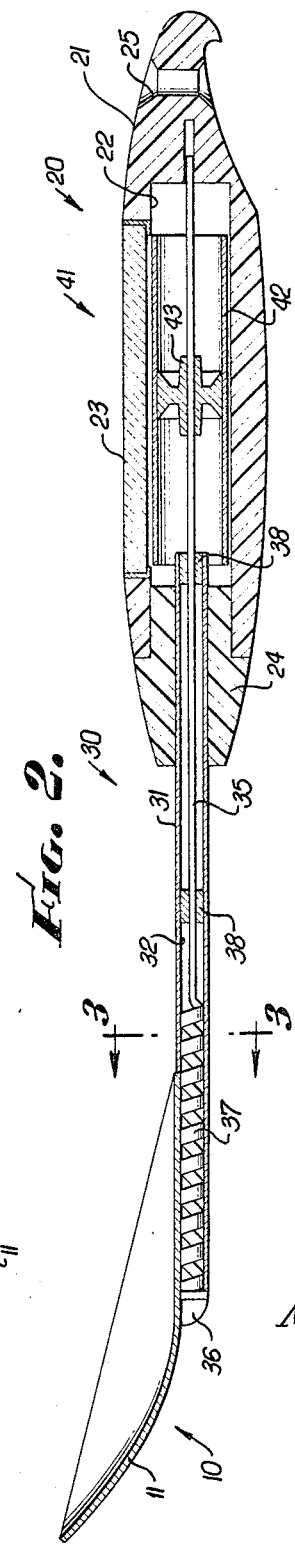
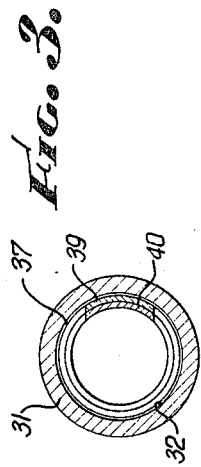
MARILYN G. CRANDELL
RUSSELL C. GATES, JR.
INVENTORS.
BY Albert M. Herzig
ATTORNEY.

Oct. 11, 1966  M. G. CRANDELL ETAL  3,277,714
TEMPERATURE INDICATING SPOON
Filed June 10, 1963  3 Sheets-Sheet 2

MARILYN G. CRANDELL
RUSSELL C. GATES, JR.
INVENTORS.

BY [signature]

ATTORNEY.

Oct. 11, 1966     M. G. CRANDELL ETAL     3,277,714
TEMPERATURE INDICATING SPOON
Filed June 10, 1963     3 Sheets-Sheet 3
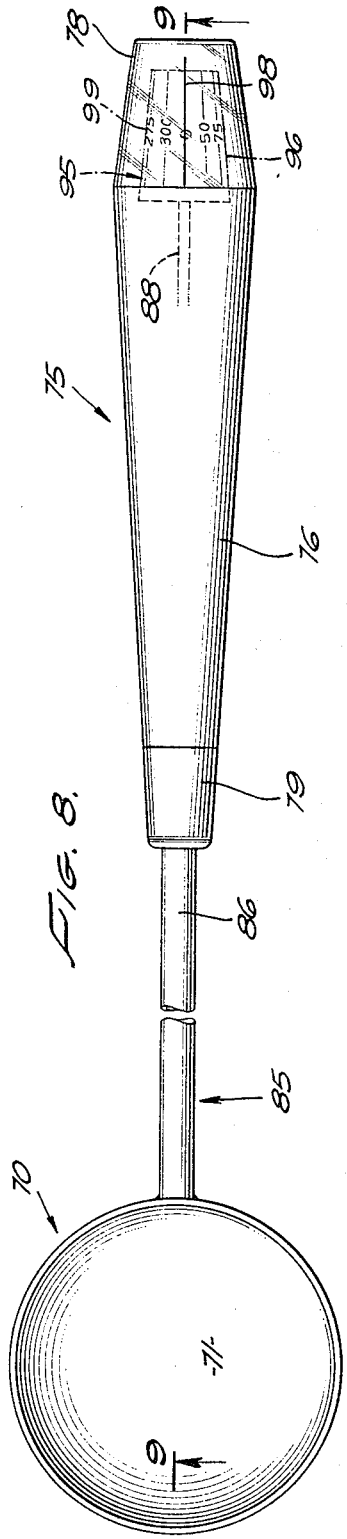
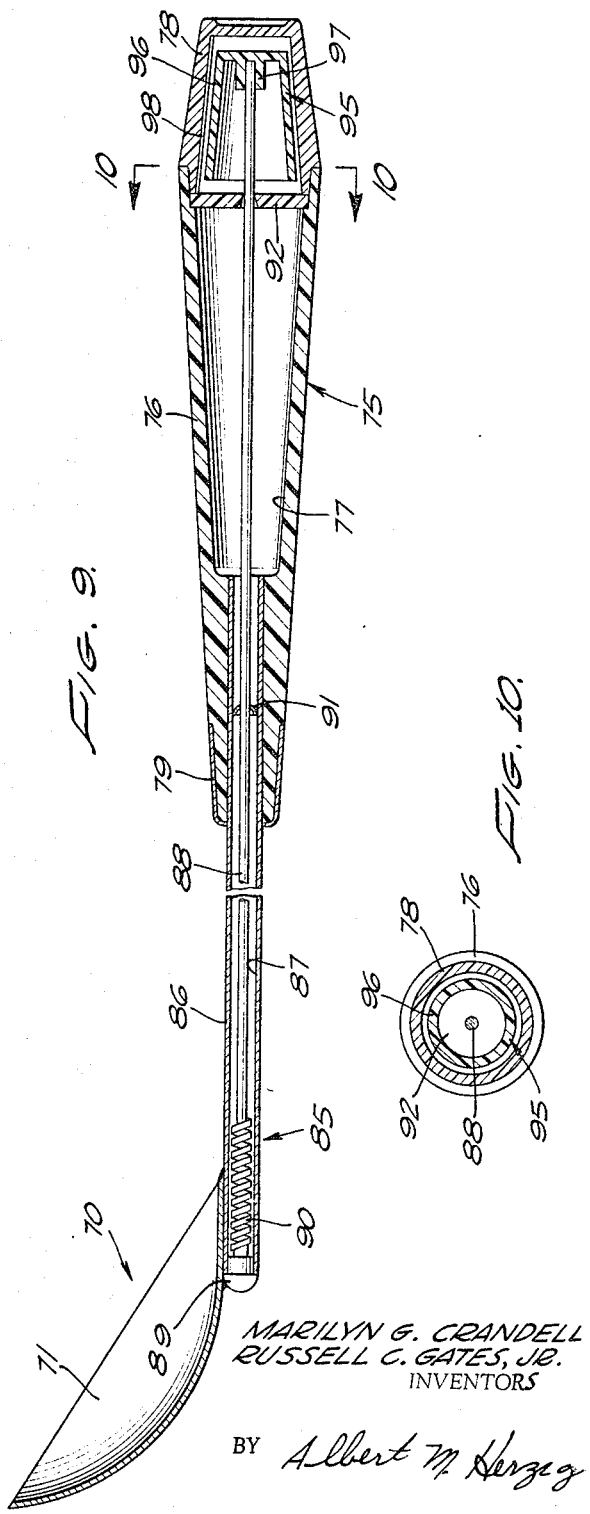
MARILYN G. CRANDELL
RUSSELL C. GATES, JR.
INVENTORS
BY Albert M. Herzog
ATTORNEY

United States Patent Office 3,277,714
Patented Oct. 11, 1966

3,277,714
TEMPERATURE INDICATING SPOON
Marilyn G. Crandell, 13946 Sunset Blvd., and Russell C. Gates, Jr., 919 Las Pulgas Road, both of Pacific Palisades, Calif.
Filed June 10, 1963, Ser. No. 288,579
6 Claims. (Cl. 73—343)

The present application is a continuation-in-part of applicants' patent application entitled "Temperature Recording Spoon," Serial No. 238,599, filed November 19, 1962, and now abandoned.

In general, the present invention relates to a durable, safe liquid mixing device adapted to provide an accurate temperature reading over a wide range of temperatures. More particularly, the present invention relates to a temperature indicating spoon which does not require an extended scale and an enlarged liquid reservoir. The term "spoon" as used in the present specification is intended to cover not only the large spoons used in food preparation centers, such as the kitchens of homes, hospitals, etc., but also baby feeding spoons and any other utensil adapted to stir liquids and including a bowl for holding a small portion of the liquid to be stored, such as ladles and the sampling devices used in factories and laboratories. The term "liquid mixing device" includes spoons and any other utensil adapted to agitate liquids, such as paddles, rods, etc.

The general concept of a temperature recording liquid mixing device is well known in the prior art, going back at least to 1873 when Grover, U.S. Patent No. 138,800 taught the combination of a thermometer located on the handle of a butter-paddle for indicating the temperature of cream or milk. Later, Ashley, U.S. Patent No. 782,433, patented the use of a thermometer attached to the handle of the spoon with the bulb of the thermometer being located in the handle of the spoon to record the temperature of various hot drinks. Monrad, U.S. Patent No. 2,035,334, also taught a thermometer located along the handle of a spoon, but with the bulb of the thermometer located in the bowl of the spoon. However, each of the aforementioned patents, as well as the numerous other patents in this art, invariably involves a liquid having a high coefficient of thermal expansion moving within a glass tube. The means for observing the temperature involves a linear scale which must be of extended length, since the thermal coefficient of expansion of all liquids is very limited. Also, for this same reason, a relatively large reservoir of fluid must be provided in the stirring device. Such arrangement has numerous serious disadvantages. First, any known fluid with an acceptable rate of expansion for use in a thermometer would contaminate food if breakage occurred. Such contamination could be extremely poisonous, as in the case of mercury which is the most commonly used thermometer liquid. Second, the use of a glass tube also results in food contamination with broken glass if breakage occurs. Third, the necessity of a large reservoir results in a reduction of the useful volume of the spoon bowl or an unnecessarily large spoon stem. Fourth, the extended length of scale required with liquid thermometers results in the scale extending a substantial distance down the spoon stem. Consequently, a large percent of the scale will normally be immersed in the fluid being mixed and, therefore, becomes unreadable.

In view of the numerous disadvantages of the prior art in temperature recording spoons, an object of the present invention is a durable, safe temperature indicating spoon which is rugged in construction and has no fluids, glass or other breakable materials in the spoon blade or stem, i.e., in the immersed portion of the spoon, which could contaminate the liquid being mixed if the spoon were broken.

Another object of the present invention is a temperature indicating spoon which requires no reservoir volume.

Still another object of the present invention is a temperature indicating spoon having a temperature indicating means completely housed in the handle of the spoon so that the liquid being mixed will not obstruct visibility.

Still another object of the present invention is a temperature indicating spoon which provides an accurate temperature reading over a wide range of temperatures with greater visibility than can be achieved with a linear scale.

Other objects and advantages of the present invention will be readily apparent from the following description and drawings which illustrate a preferred exemplary embodiment of the present invention.

In general, the present invention involves a durable, safe liquid mixing device adapted to provide accurate temperature readings over a wide range of temperatures without requiring an extended scale and an enlarged liquid reservoir therein. The device comprises a stirring portion adapted to agitate liquid and a handle portion having a hollow core and a transparent window in communication with said hollow core. The device also includes a temperature sensing portion connecting the stirring portion and handle portion. The temperature sensing portion consists essentially of at least a first part of solid material having a low coefficient of thermal expansion and a second part of solid material having a substantially higher coefficient of thermal expansion. Such temperature sensing portion has a hollow stem connecting and fixed to the stirring portion and handle portion and opening into the hollow core of the handle portion. The temperature sensing portion also includes a shaft slidably mounted in the hollow axis of the stem and hollow core of the handle portion and fixed adjacent to the stirring portion. The shaft has an indicator means mounted thereon and such indicator means and handle window are adapted to operate together to indicate temperature accurately over a wide range of temperatures and to expose said temperature indication to external view.

In order to facilitate understanding of the present invention, reference will now be made to the appended drawings of a preferred specific embodiment of the present invention. Such drawings should not be construed as limiting the invention which is properly set forth in the appended claims.

In the drawings:

FIG. 1 is a plan view of a preferred embodiment of a temperature indicating spoon of the present invention.

FIG. 2 is a cross-sectional view of the spoon shown in FIG. 1 taken along the line 2—2.

FIG. 3 is a cross-sectional view of the spoon shown in FIG. 2 taken along the line 3—3 of FIG. 2.

FIG. 8 is a plan view of still another embodiment of the temperature indicating spoon of the present invention.

FIG. 9 is a cross-sectional view of the spoon shown in FIG. 8 taken along the line 9—9 of FIG. 8.

FIG. 10 is a cross-sectional view of FIG. 9 taken along the line 10—10 of FIG. 9.

Figure 4:
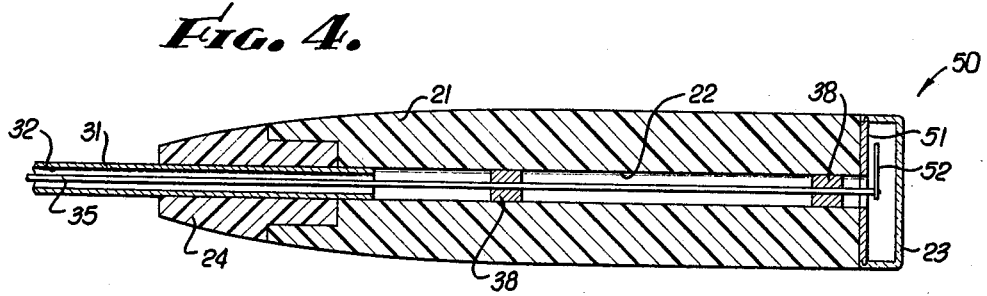
FIG. 4 is a partial longitudinal cross-section of another embodiment of the temperature indicating spoon of the present invention.

As illustrated in FIGS. 1–3, the preferred embodiment of the present invention involves a stirring portion 10, a handle portion 20, and a temperature sensing portion 30. The stirring portion 10 is adapted to agitate liquids and consists simply of a spoon bowl 11. The handle portion 20 consists simply of a handle 21 having a hollow core 22 and a transparent window 23 in communication with the hollow core 22. The handle 21 may include a cap portion 24 which is designed to facilitate assembly of the temperature indicating spoon of the present invention. The handle 21 may also include an aperture 25 whereby the temperature indicating spoon may be conveniently hung on a hook.

The temperature sensing portion 30 connects the stirring portion 10 and the handle portion 20. The temperature sensing portion 30 includes a hollow stem 31 connecting and fixed to the stirring portion 10 and the handle portion 20. After insertion into the cap 24 of the handle 21, the rotation of stem 31 is prevented by means of serrations on its surface. The hollow axis 32 of the stem 31 opens into the hollow core 22 of the handle portion 20. The temperature sensing portion 30 also includes a shaft 35 rotatably mounted in the hollow axis 32 of stem 31 and the hollow core 22 of the handle portion 20. The shaft 35 is also fixed adjacent to the bowl 11 at 36 by any convenient means, such as soldering. The sensing portion 37 of the shaft 35 adjacent to the bowl has a helical configuration adapted to promote the rotation of the shaft due to temperature changes as set forth hereinafter. Also, the shaft 35 is positioned along the axis of the stem 31 and the handle 21 by means of bushings 38.

As illustrated in FIGS. 1–3, the sensing portion 37 of the shaft 35 consists essentially of at least a first layer 39 of solid material having a low coefficient of thermal expansion and a second layer 40 of a different solid material having a substantially higher coefficient of thermal expansion. Such construction combined with the helical configuration adjacent the fixed end 36 of the shaft 35 adapts the shaft to rotate about its longitudinal axis when it is subjected to temperature changes. The shaft 35 also has an indicator means 41 mounted thereon in the hollow handle core. The indicator means 41 includes a spool 42 mounted on a hub 43 and the hub 43 is in turn mounted on the shaft 35. The spool 42 and the handle window 23 are adapted to operate together to indicate temperature accurately over a wide range of temperatures and to expose said temperature reading to external view. Specifically, the handle window 23 has a straight index line 26 along its length and the spool 42 has a temperature scale 44 marked around its circumference.

Figure 5:
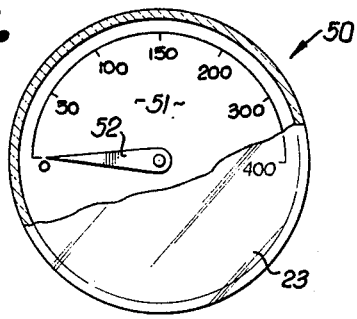
FIG. 5 is a handle end view of the spoon in FIG. 4.

In FIGS. 4 and 5, another embodiment of the present invention is illustrated wherein the handle 21 has a hollow core 22 through which the shaft 35 extends and is centered by bushings 38. However, in this embodiment of the present invention, a dial 50 is mounted in the handle 21 adjacent the handle window 23. The dial 50 has a face 51 with a temperature scale thereon and a needle 52 adapted to be rotated by the rotation of the shaft 53. The dial 50 and the handle window 23 are adapted to operate together to indicate temperature accurately over a wide range of temperature and to expose the temperature reading to external view. It is obvious from the embodiment shown in FIGS. 4 and 5 that if desired the dial face 51 may be eliminated and the handle window 23 may have the temperature scale marked thereon and the same results would be achieved.

Figure 6:
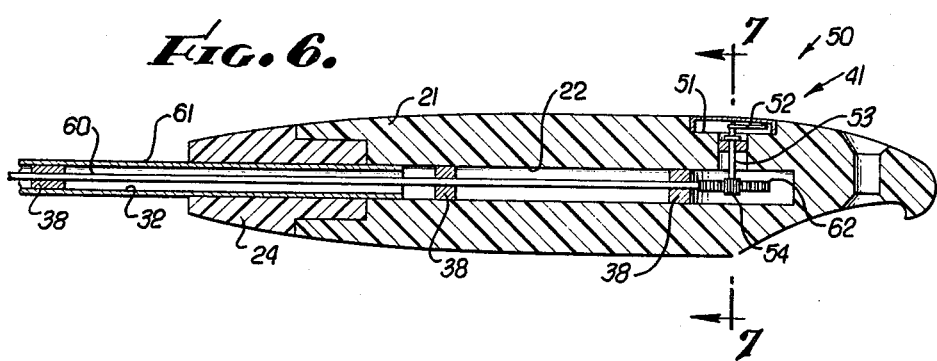
FIG. 6 is a partial longitudinal cross-section of still another embodiment of the temperature indicating spoon of the present invention.
Figure 7:
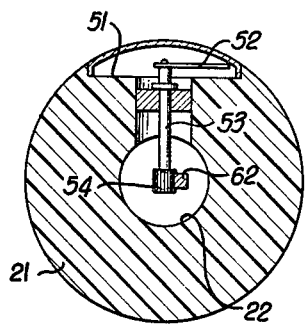
FIG. 7 is a cross-sectional view of the spoon shown in FIG. 6 taken along the line 7—7 of FIG. 6.

In FIGS. 6 and 7, still another embodiment of the present invention is illustrated wherein the shaft 60 consists essentially of a first solid material having a low coefficient of thermal expansion and the stem 61 consists of a second material having a substantially higher coefficient of thermal expansion. The shaft 60 is centered by means of bushings 38 along the hollow axis 32 of the stem 61 and the hollow core 22 of the handle 21. The shaft 60 has an indicator means 41 mounted thereon in the hollow handled core 22 which comprises a dial 50. The dial 50 includes a face 51 having a temperature scale marked thereon and a needle 52 adapted to be rotated by longitudinal motion of the shaft 60. The needle 52 is connected to the shaft 60 through an arm 53 and a cog wheel 54 which meshes with the row of teeth 62 on the shaft 60. Thus, in the embodiment of FIGS. 6–7, the longitudinal sliding motion of the shaft 60, due to the difference in expansion rates between the shaft 60 and the stem 61 during temperature changes, is translated into the reading on the dial 50.

In FIGS. 8–10, still another embodiment of the present invention is illustrated wherein the stirring portion 70 consists simply of a spoon bowl 71 having a circular circumference and shaped in the form of a portion of a sphere. The handle portion 75 consists simply of a handle 76 having a hollow core 77 and a transparent window 78 which forms the end of the handle 75 remote from the bowl 71. The handle 76 is attached to the temperature sensing portion 85 by means of a ferrule 79.

The temperature sensing portion 85 includes a hollow stem 86 connecting and fixed to the stirring portion 70 and the handle portion 75. The hollow axis or bore 87 of the stem 86 opens into the hollow core 77 of the handle portion 75. The temperature sensing portion 85 also includes a shaft 88 rotatably mounted in the hollow bore 87 of the stem 86 and the hollow core 77 of the handle 76. The shaft 88 is fixed adjacent to the bowl 71 at 89 by any convenient means such as soldering. A sensing portion 90 of the shaft 88 adjacent to the bowl has a helical configuration adapted to promote the rotation of the shaft due to temperature changes as set forth below. Also, the shaft 88 is positioned along the axis of the stem 86 and the handle 76 by means of bushings 91 and 92. The shaft 88 also has an indicator means 95 mounted thereon in the hollow core 77 of the handle 76 and its window 78. The indicator means 95 includes a spool 96 substantially enclosed by the handle window 78 and mounted on a hub 97 with the hub 97 in turn mounted on the shaft 88. The spool 96 and the handle window 78 are adapted to operate together to indicate temperature accurately over a wide range of temperatures and to expose such temperature readings to external view. Specifically, the handle window 78 has a straight index line 98 along its length and the spool 96 has a temperature scale 99 marked around its circumference.

The operation of the temperature indicating spoon shown in FIGS. 1–3 will be obvious to one skilled in the art. Due to the difference in the coefficient of thermal expansion between the first layer 39 and the second layer 40, a change in temperature causes the shaft 35 to rotate. For example, the change of temperature from 50° F. to 450° F. may cause the shaft 35 to rotate through a full 360° F. For a baby feeding spoon, such range may be 50° F. to 150° F.

The temperature indicating spoon of the present invention may be constructed of durable, safe and very inexpensive materials. The handle may be made of any material, such as plastic, which is temperature-resistant, easy to clean, etc. The transparent window may be made of a clear, durable material, such as Lexan plastic or glass. The bowl and stem are preferably made of metal, such as stainless steel. However, in the embodiment of the present invention which utilizes longitudinal expansion of the shaft, the stem must be made of a material, such as metal, having the desired coefficient of thermal expansion. Where the sensing portion of the shaft is composed of two layers, each having a different thermal coefficient of expansion, both layers may be made of different metals or one may be made of metal and the other of ceramic. For example, in the case of two metals, the layer having the low coefficient of thermal expansion may be made of "Invar" which is a well known nickel-iron alloy. The layer having the higher coefficient of thermal expansion may be made of brass. In the case of a ceramic and a metal, the ceramic material will normally have a low coefficient of thermal expansion, as well as being hard, nonporous and having high strength and high temperature resistance, so the other layer will normally be made of a metal having a high coefficient of thermal expansion, such as brass. Where the sensing portion of the shaft has two layers, the two layers are normally laminated together by a high temperature direct welding process so that no intermediate bonding material will be present to interfere with the physical property of the layers of metal.

Many other specific embodiments of the present invention will be obvious to one skilled in the art in view of this disclosure. For example, as illustrated in the figures, either rotating motion or linear motion may be utilized to translate a temperature difference into a temperature reading. Furthermore, although one of the parts of the temperature sensing means whose thermal coefficient of expansion is utilized must be present in the slidable shaft in the stem, the other part whose coefficient of thermal expansion is utilized may be located as a second layer on the sensing portion of the shaft or may comprise the stem itself, as illustrated.

There are many features in the present invention which clearly show the significant advance the present invention represents over the prior art. Consequently, only a few of the more outstanding features will be pointed out to illustrate the unexpected and unusual results attained by the present invention.

One of the features of the present invention is a temperature indicating spoon which is rugged in construction and has no fluids, glass or other breakable material immersed in the liquid which could contaminate the liquid being mixed if the spoon were broken. Also, no liquid reservoir is required. Another feature of the present invention is that the indicator means may be completely housed in the handle so that the liquid being mixed will not obstruct visibility. Still another feature of the present invention, particularly with respect to the preferred embodiment, is that a more accurate reading of a larger range of temperatures may be obtained with a greater visibility than can be achieved with a linear scale. Since only the bowl portion of the shaft in the temperature sensing portion reacts to temperature changes and such bowl portion is normally completely immersed in the liquid whose temperature is being measured, more reliable and reproducible temperature readings can be obtained.

Another feature of a preferred embodiment of the present invention involves the use of a bowl which is shaped in the form of a portion of a sphere. Such shape permits the bowl to pour the liquid contained therein in any direction in a smooth, thin and narrow stream so that spilling is avoided even when the liquid is being poured into a container having only a small opening. Furthermore, such spherical shape avoids the necessity of forming a spout in the spoon and permits the spoon to be used to scoop liquids from portions of the container which are normally relatively inaccessible. Still another feature of the present invention involves placement of the temperature indicator means on the end of the handle remote from the bowl of the spoon. Such arrangement permits the handle to be conveniently grasped by the hand and yet leaves the handle window open for easy observation.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered part of the present invention.

I claim:

1. A temperature indicating spoon comprising: a spoon bowl member; a hollow low-conductive handle having a transparent wall portion; a hollow stem of material having a high heat conductivity, said stem having a closed end portion secured to an exterior surface of said bowl member but otherwise exposed to ambient space and having an open end extending into and secured to said hollow handle; temperature responsive means in said stem, secured thereto adjacent said closed end and comprising a temperature sensing portion adjacent said closed end and a movable shaft extending along said stem and into said hollow handle; and movable temperature indicating means in said handle and viewable through said transparent wall portion, said temperature indicating means being operatively connected to said shaft to be responsive to movements thereof.

2. A temperature indicating spoon as defined in claim 1 including bearing means holding said shaft substantially centrally of said stem and handle.

3. A temperature indicating spoon as defined in claim 1 wherein said temperature sensing portion comprises a helical sensing device having said shaft secured to an end thereof whereby said shaft is caused to rotate in response to a change in temperature, said indicating means being secured to said shaft inwardly of said transparent wall portion.

4. A temperature indicating spoon as defined in claim 3 wherein said transparent wall portion comprises the outer end of said handle, said indicating means being a drum fixed to the end of said shaft.

5. A temperature indicating spoon as defined in claim 4 including bearing means in said stem holding said shaft centrally thereof and bearing means in said handle, adjacent said drum, holding said shaft centrally of said handle.

6. A temperature indicating spoon as defined in claim 4 wherein said drum is provided with indicia defining a temperature scale extending therearound, said handle having an index thereon cooperable with said scale.

References Cited by the Examiner

UNITED STATES PATENTS

| 1,429,975 | 9/1920 | Roth et al. | 73—363.9 |
| 1,489,116 | 4/1924 | Chevenard | 73—343 |
| 1,776,240 | 9/1930 | Wunsch | 73—363 |
| 2,035,334 | 3/1936 | Monrad | 73—343 |
| 2,179,158 | 11/1939 | Marks | 73—343 X |
| 2,573,686 | 11/1951 | Blinn et al. | 73—363.5 |
| 2,597,939 | 5/1952 | Lamb | 73—363.9 X |
| 2,652,725 | 9/1953 | Lamb | 73—343 |
| 3,002,386 | 10/1961 | Flanagan | 73—378.3 |

FOREIGN PATENTS

| 587,261 | 4/1947 | Great Britain. |

LOUIS R. PRINCE, *Primary Examiner.*

DAVID SCHONBERG, *Examiner.*

D. M. YASICH, *Assistant Examiner.*